Figure 1:
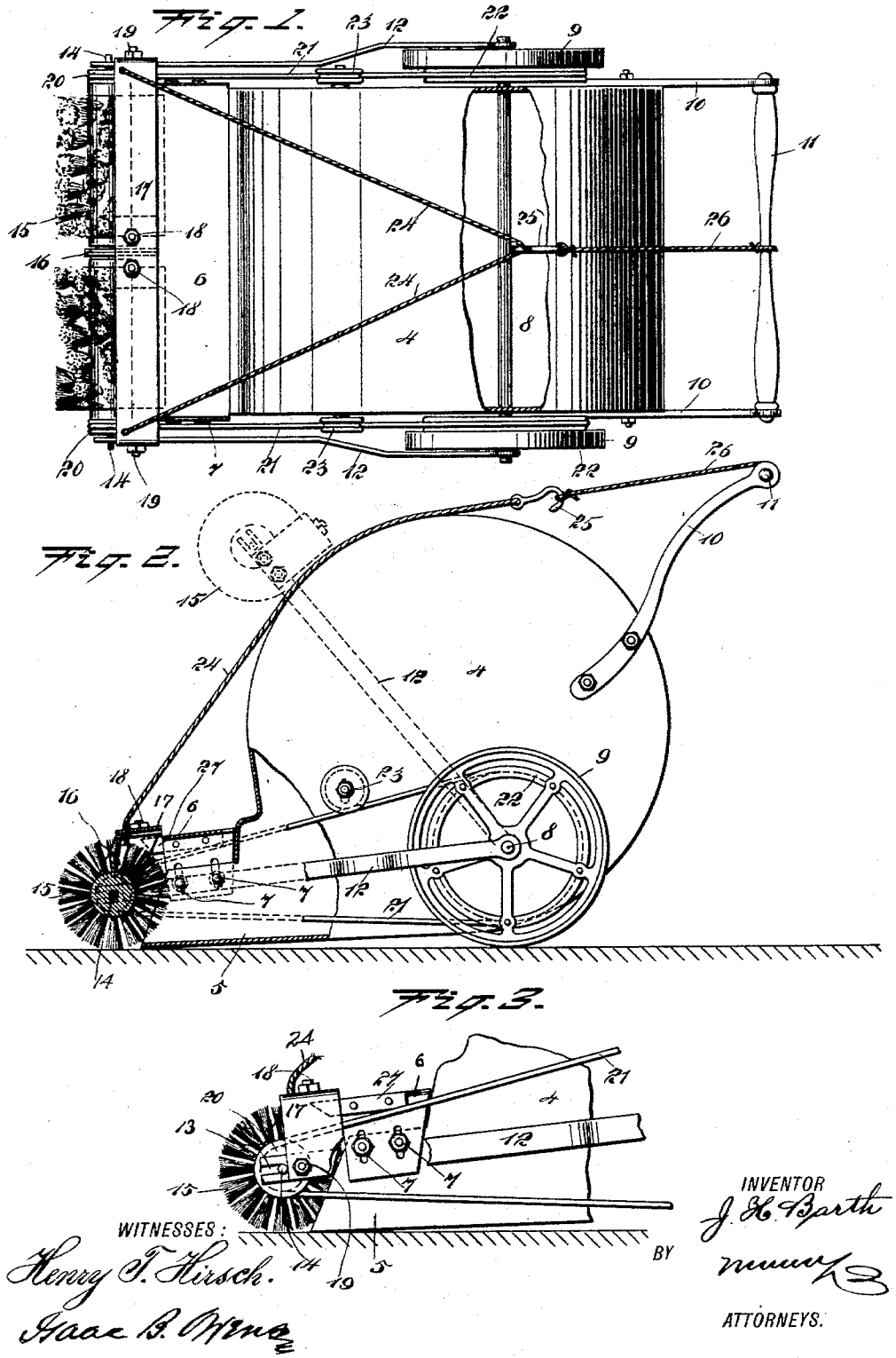

(No Model.) 2 Sheets—Sheet 2.

J. H. BARTH.
STREET SWEEPER.

No. 593,075. Patented Nov. 2, 1897.

Fig. 2.

WITNESSES:
Henry F. Hirsch.
Isaac B. Owens

INVENTOR
J. H. Barth.
BY
ATTORNEYS.

UNITED STATES PATENT OFFICE.

JOHN H. BARTH, OF INDIANAPOLIS, INDIANA.

STREET-SWEEPER.

SPECIFICATION forming part of Letters Patent No. 593,075, dated November 2, 1897.

Application filed March 8, 1897. Serial No. 626,426. (No model.)

*To all whom it may concern:*

Be it known that I, JOHN H. BARTH, of Indianapolis, in the county of Marion and State of Indiana, have invented a new and Improved Street-Sweeper, of which the following is a full, clear, and exact description.

The invention relates to an improvement in that class of street-sweepers which are pushed manually along the street and provided with a dust-receptacle adjacent to which a brush revolves to throw the dirt into the dust-receptacle.

The invention consists in certain features of construction and combinations of parts, as will be fully described hereinafter and defined in the claims.

Reference is to be had to the accompanying drawings, forming a part of this specification, in which similar characters of reference indicate corresponding parts in all the figures.

Figure 1 is a plan view of my invention with parts broken away. Fig. 2 is a side elevation of the invention with parts in section. Fig. 3 is a fragmentary elevation, and Fig. 4 is an elevational view of a modified form of my invention.

The drum or dust-receptacle 4 is approximately cylindrical in general form and provided at its lower side with a forwardly-extending chute 5, the form of which is straight and the sides of which extend perpendicularly, respectively, in the planes of the ends of the drum 4. The top of the chute 5 is closed by a cap-plate 6, which extends transversely from one side to the other of the chute and has vertically-elongated slots in its sides, through which bolts 7 pass, whereby the cap-plate 6 may be adjusted vertically with reference to the chute 5. Mounted in the lower rear portion of the drum 4 is an axle 8, whereon the wheels 9 are mounted. These wheels serve to carry the drum and also to transmit movement to the brush. Fixed to each end of the drum 4 and projecting rearwardly therefrom are arms 10, to the outer ends of which the handle-bar 11 is fixed. By these means the operator propels the machine.

Pivotally connected to each end of the axle 8 is an arm 12. The arms 12 extend forwardly beyond the chute 5 and have their free ends formed with slots 13, in which the trunnions 14 of the brushes 15 are revolubly mounted. The brushes 15 are carried on a shaft common to each brush, and the trunnions of the brushes are held within the slots 13 by means of an intermediately-located arm 16, projecting from a transverse plate 17 and secured thereto by bolts 18. The plate 17 extends transversely from one of the arms 12 to the other and has downwardly-projecting side portions rigidly secured to the respective arms 12 by means of bolts 19.

Fixed to each outer end of the brushes 15 is a pulley 20, around which the respective belts 21 pass. The belts 21 extend rearwardly around sheaves 22, respectively carried by the inner sides of the wheels 9. Idler-pulleys 23 are adjustably secured to the sides of the drum 4 and bear downward on the upper runs of the belts 21 to serve as tighteners therefor.

A cord 24 has its ends respectively connected to the ends of the plate 17. The cord 24 extends upward around the top of the drum 4 and is provided with a hook 25, to which a second cord 26 may be connected, such cord 26 passing in turn to the handle-bar 11. By these means the brushes 15 and the arms 12 and plate 17 may be lifted to the position shown by dotted lines in Fig. 2 without causing a corresponding movement of the drum 4, provided the belts 21 be disengaged from the pulleys 23. It is also possible to lift the drum 4 and all of the attached parts to a tilted position, the machine turning on the wheels 9. The raising of the brushes independently of the drum is useful in emptying the drum of its contents, and the tilting of the drum rearward on the wheels 9 is useful in throwing the contents of the drum into the rear part thereof and from the chute 5. Each end of the plate 6 is provided with a plate 27, which extends forwardly and is engaged by the under side of the plate 17. By these means the plate 17, with the brush 15 and arms 12, is supported in proper position. By adjusting the plates 6 through the medium of the bolts 7 and the elongated slots wherein the bolts operate the position of the plate 17 may be adjusted, and consequently the brush made to engage the ground with more or less force.

In using the invention the machine is pushed along the street, whereupon as the wheels 9 revolve the brush 15 will be turned to sweep the street and throw the dust and dirt on the chute 5, from whence it may be removed by tilting the machine rearward. When the contents of the drum are to be removed, the brush 15 and its attached parts are raised to the position shown by dotted lines in Fig. 2, whereupon the drum may be tilted forward and the dirt removed therefrom.

The modified form of my invention consists in a multiplying-gear for more rapidly driving the brushes 15. This gear comprises a sheave 28, fixed on each wheel 9 and having a belt 29 passed over them and respectively around small pulleys 30, carried on stub-shafts 31, respectively mounted in the arms 12'. The stub-shafts 31 respectively carry pulleys 32, larger than the pulleys 30 and having the belts 33 running around them and to the small pulleys 34, respectively, on the trunnions 15. By these means the brushes 15 are driven at a higher rate of speed than by the gearing shown in Figs. 1, 2, and 3.

Having thus described my invention, I claim as new and desire to secure by Letters Patent—

1. A street-sweeper having a drum with a forwardly-extending chute, wheels whereon the drum is mounted, a brush mounted to swing on the drum and normally located in front of the chute, a cover-plate closing the top of the chute and adjustable vertically thereon, a plate in connection and moving with the brush, means for driving the brush, and a supporting-plate fixed to the cover-plate and engaged by the under side of the plate which is in connection with the brush, substantially as described.

2. A street-sweeper having a drum with a forwardly-extending chute, a shaft passing through the drum, wheels carried by the shaft and upon which the drum is mounted, an arm fixed to each end of the shaft, a brush revolubly mounted in the free ends of the arms and normally located in front of the chute, a cover-plate located above the chute and adjustable vertically thereon, the cover-plate having a forwardly-projecting plate secured thereto, and a plate in rigid connection with the arms and holding the brush in place, the last-named plate having its lower side engaging the plate on the cover-plate of the chute to hold the brush in position, substantially as described.

3. A street-sweeper, having a drum with a forwardly-extending chute, a shaft passing through the drum, wheels mounted on the shaft, an arm pivoted to each end of the shaft and projecting forwardly, a brush carried by the arms and normally located at the front of the chute, a cover-plate carried by the chute and adjustable vertically thereon, means for holding the brush in connection with the arms, and a supporting-plate carried by the cover-plate and engaging said means for holding the brush whereby to support the brush, substantially as described.

4. A street-sweeper having a drum with a forwardly-extending chute, the chute having perpendicular sides, a cover-plate for the chute with downwardly-extended end portions adjustable vertically on the sides of the chute, a shaft extending through the drum, wheels mounted on the shaft, an arm pivoted to each end of the shaft, the arms extending forwardly to the front of the chute, a brush revolubly mounted in the arms, a belt driving the brush from one of the wheels, a plate extending transversely between the arms and having vertically-extending portions respectively secured to the arms, the plate being connected with the brush to hold the same in place, and a supporting-plate carried by the cover-plate and engaging the plate that is connected to the arms whereby to support the brush, substantially as described.

JOHN H. BARTH.

Witnesses:
FRED W. HANSON,
WALTER V. BOZELL.